United States Patent
Chen et al.

(10) Patent No.: US 11,190,994 B2
(45) Date of Patent: Nov. 30, 2021

(54) METHOD OF TRIGGERING INTRA-FREQUENCY MEASUREMENT OF TERMINAL, DEVICE THEREOF, TERMINAL AND BASE STATION

(71) Applicants: China Mobile Communication Co., Ltd Research Institute, Beijing (CN); China Mobile Communications Group Co., Ltd., Beijing (CN)

(72) Inventors: Ningyu Chen, Beijing (CN); Qiuxiang Li, Beijing (CN); Hang Cui, Beijing (CN); Rui Wang, Beijing (CN); Furong Xu, Beijing (CN); Nan Hu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 36 days.

(21) Appl. No.: 16/605,170

(22) PCT Filed: Apr. 10, 2018

(86) PCT No.: PCT/CN2018/082473
§ 371 (c)(1),
(2) Date: Oct. 14, 2019

(87) PCT Pub. No.: WO2018/188579
PCT Pub. Date: Oct. 18, 2018

(65) Prior Publication Data
US 2020/0267612 A1 Aug. 20, 2020

(30) Foreign Application Priority Data
Apr. 14, 2017 (CN) .......................... 201710244514.5

(51) Int. Cl.
*H04W 36/00* (2009.01)
*H04L 5/00* (2006.01)
(Continued)

(52) U.S. Cl.
CPC ....... *H04W 36/0094* (2013.01); *H04L 5/0042* (2013.01); *H04W 36/14* (2013.01);
(Continued)

(58) Field of Classification Search
CPC . H04W 36/0094; H04W 36/14; H04W 36/26; H04W 36/30; H04W 48/16;
(Continued)

(56) References Cited

U.S. PATENT DOCUMENTS 10,652,890 B1 * 5/2020 Oroskar ............ H04W 72/0453
2013/0077507 A1 * 3/2013 Yu .................... H04W 36/0061
370/252
(Continued)

FOREIGN PATENT DOCUMENTS

CN 101600221 A 12/2009
CN 102238618 A 11/2011
(Continued)

OTHER PUBLICATIONS

Chinese Office Action, dated Apr. 18, 2019, for Chinese Patent Application No. 201710244514.5 (with English-language translation).
(Continued)

*Primary Examiner* — Kiet M Doan
(74) *Attorney, Agent, or Firm* — Morgan, Lewis & Bockius LLP

(57) ABSTRACT

A method of triggering an intra-frequency measurement of a terminal, a device of triggering an intra-frequency measurement of a terminal, a terminal and a base station are provided. The method includes: acquiring parameter infor-
(Continued)

```
┌─────────────────────────────────────────────────────────────┐ 21
│ acquiring parameter information sent by a base station and  │
│ configured to determine whether to trigger an intra-frequency│
│ measurement, where the parameter information is the first   │
│ threshold value information and the supplementary           │
│ information of the first threshold value information which  │
│ are configured to be compared with the receiving power of   │
│ the terminal                                                │
└─────────────────────────────────────────────────────────────┘
                            │
                            ▼                                  22
┌─────────────────────────────────────────────────────────────┐
│ acquiring, based on the first threshold value information   │
│ and the supplementary information of the first threshold    │
│ value information, a first value configured to be compared  │
│ with the receiving power of the terminal                    │
└─────────────────────────────────────────────────────────────┘
                            │
                            ▼                                  23
┌─────────────────────────────────────────────────────────────┐
│ determining whether to perform the intra-frequency          │
│ measurement based on the first value and the receiving      │
│ power of the terminal                                       │
└─────────────────────────────────────────────────────────────┘
``` mation sent by a base station and configured to determine whether to trigger an intra-frequency measurement; determining whether to perform the intra-frequency measurement based on the parameter information.

16 Claims, 6 Drawing Sheets

(51) Int. Cl.
    *H04W 36/14*     (2009.01)
    *H04W 36/26*     (2009.01)
    *H04W 36/30*     (2009.01)
    *H04B 17/318*     (2015.01)

(52) U.S. Cl.
    CPC ........... *H04W 36/26* (2013.01); *H04W 36/30* (2013.01); *H04B 17/318* (2015.01)

(58) Field of Classification Search
    CPC .............. H04W 48/12; H04W 36/0083; H04L 5/0042; H04B 17/318
    USPC ......................................... 455/436, 509, 434
    See application file for complete search history.

(56) References Cited

U.S. PATENT DOCUMENTS

| | | |
|---|---|---|
| 2013/0188499 A1 | 7/2013 | Mach et al. |
| 2014/0177622 A1 | 6/2014 | Juncker et al. |
| 2014/0335868 A1* | 11/2014 | Kubota ............. H04W 36/0088 455/437 |
| 2015/0004982 A1* | 1/2015 | Falconetti ......... H04W 36/0088 455/437 |
| 2015/0334612 A1* | 11/2015 | Chaudhuri ........ H04W 36/0072 455/437 |
| 2016/0205575 A1 | 7/2016 | Jung |
| 2016/0212664 A1 | 7/2016 | Uemura et al. |
| 2016/0316411 A1 | 10/2016 | Jung et al. |

FOREIGN PATENT DOCUMENTS

| | | |
|---|---|---|
| CN | 102572913 A | 7/2012 |
| CN | 104349416 A | 2/2015 |
| CN | 104811953 A | 7/2015 |
| CN | 105992296 A | 10/2016 |
| EP | 3 079 411 A1 | 10/2016 |
| JP | 2016-539564 A | 12/2016 |
| WO | WO 2013/051866 A1 | 4/2013 |
| WO | WO 2016/085109 A1 | 6/2016 |

OTHER PUBLICATIONS

Chinese Office Action, dated Oct. 12, 2019, for Chinese Patent Application No. 201710244514.5 (with English-language translation).
International Preliminary Report on Patentability dated Oct. 15, 2019 and Written Opinion dated Jun. 11, 2018, for International Application No. PCT/CN2018/082473, filed Apr. 10, 2018 (English-language translation).
Supplementary European Search Report dated Nov. 25, 2020 for European Patent Application No. EP 18 78 5089, filed Apr. 4, 2018 (EP3079411 A1).
R2-1703956, 3GPP TSG-RAN WG2 Meeting #97bis, Spokane, USA, Apr. 3-7, 2017, Agenda 17.1.3, pp. 24.
R2-1703196, 3GPP TSG-RAN WG2 Meeting #97bis, Spokane, USA, Apr. 3-7, 2017, Agenda 10.4.2.2, pp. 3.
R2-1702929, 3GPP TSG-RAN WG2 Meeting #97, Athens, Greece, Feb. 13-17, 2017, pp. 2.
Japanese Office Action, dated Nov. 27, 2020, for Japanese Patent Application No. 2019-555796, pp. 4.
Japanese Office Action, dated Nov. 27, 2020, for Japanese Patent Application No. 2019-555796—English translation, pp. 4.

* cited by examiner

31 — acquiring parameter information sent by a base station and configured to determine whether to trigger an intra-frequency measurement, where the parameter information includes the first threshold value information and the supplementary information of the first threshold value information which are configured to be compared with the receiving power of the terminal and the second threshold value information configured to be compared with the quality of the received signal of the terminal 32 — acquiring, based on the first threshold value information and the supplementary information of the first threshold value information, a first value configured to be compared with the receiving power of the terminal, and obtaining a second value based on the second threshold value information 33 — determining whether to perform the intra-frequency measurement based on the first value, the second value, the receiving power of the terminal, and the quality of the received signal of the terminal

FIG.3

41 — acquiring parameter information sent by a base station and configured to determine whether to trigger an intra-frequency measurement, where the parameter information includes the first threshold value information and the supplementary information of the first threshold value information which are configured to be compared with the receiving power of the terminal and the third threshold value information configured to be compared with the received Signal to Interference plus Noise Ratio of the terminal 42 — acquiring, based on the first threshold value information and the supplementary information of the first threshold value information, a first value configured to be compared with the receiving power of the terminal, and obtaining a third value based on the third threshold value information 43 — determining whether to perform the intra-frequency measurement based on the first value, the third value, the receiving power of the terminal and the received Signal to Interference plus Noise Ratio of the terminal

FIG.4

```
                                                                           ╭─ 61
┌─────────────────────────────────────────────────────────────────────────┐
│  acquiring parameter information sent by a base station and configured  │
│  to determine whether to trigger an intra-frequency measurement, where  │
│  the parameter information includes the transmission power information │
│  of the base station, the first threshold value information and the     │
│  supplementary information of the first threshold value information    │
│  which are configured to be compared with the receiving power of the    │
│  terminal and the second threshold value information configured to be   │
│  compared with the quality of the received signal of the terminal       │
└─────────────────────────────────────────────────────────────────────────┘
                                      │
                                      ▼                                ╭─ 62
┌─────────────────────────────────────────────────────────────────────────┐
│  acquiring, based on the transmission power information of the base     │
│  station and the first threshold value information and the              │
│  supplementary information of the first threshold value information,    │
│  a fourth value configured to be compared with the receiving power      │
│  of the terminal, and obtaining a second value based on the second      │
│  threshold value information                                            │
└─────────────────────────────────────────────────────────────────────────┘
                                      │
                                      ▼                                ╭─ 63
┌─────────────────────────────────────────────────────────────────────────┐
│  comparing the receiving power of the terminal with the fourth value,   │
│  and comparing the quality of the received signal of the terminal with  │
│  the second value, to determine whether to perform the intra-frequency  │
│  measurement                                                            │
└─────────────────────────────────────────────────────────────────────────┘
```

FIG.6

```
                                                                           ╭─ 71
┌─────────────────────────────────────────────────────────────────────────┐
│  acquiring parameter information sent by a base station and configured  │
│  to determine whether to trigger an intra-frequency measurement, where  │
│  the parameter information includes the transmission power information │
│  of the base station, the first threshold value information and the     │
│  supplementary information of the first threshold value information     │
│  which are configured to be compared with the receiving power of the    │
│  terminal and the third threshold value information configured to be    │
│  compared with the received Signal to Interference plus Noise Ratio     │
│  of the terminal                                                        │
└─────────────────────────────────────────────────────────────────────────┘
                                      │
                                      ▼                                ╭─ 72
┌─────────────────────────────────────────────────────────────────────────┐
│  acquiring, based on the transmission power information of the base     │
│  station and the first threshold value information and the              │
│  supplementary information of the first threshold value information,    │
│  a fourth value configured to be compared with the receiving power      │
│  of the terminal, and obtaining a third value based on the third        │
│  threshold value information                                            │
└─────────────────────────────────────────────────────────────────────────┘
                                      │
                                      ▼                                ╭─ 73
┌─────────────────────────────────────────────────────────────────────────┐
│  comparing the receiving power of the terminal with the fourth value,   │
│  and comparing the received Signal to Interference plus Noise Ratio     │
│  of the terminal with the third value, to determine whether to perform  │
│  the intra-frequency measurement                                        │
└─────────────────────────────────────────────────────────────────────────┘
```

FIG.7

METHOD OF TRIGGERING INTRA-FREQUENCY MEASUREMENT OF TERMINAL, DEVICE THEREOF, TERMINAL AND BASE STATION

CROSS REFERENCE OF RELATED APPLICATION

The present application is the U.S. national phase of PCT Application PCT/CN2018/082473 filed on Apr. 10, 2018, which claims a priority of Chinese patent application No. 201710244514.5 filed on Apr. 14, 2017, which is incorporated herein by referenced in its entirety.

TECHNICAL FIELD

The present disclosure relates to the field of mobile communications technologies, and in particular, to a method of triggering an intra-frequency measurement of a terminal, a device of triggering an intra-frequency measurement of a terminal, a terminal and a base station.

BACKGROUND

In the cell reselection process in the related art, when the terminal detects that the current cell's Srxlev (RSRP) is lower than the reselection threshold or the Squal (RSRQ) is lower than the reselection threshold Q, the terminal starts the intra-frequency measurement and prepares for cell reselection. Here, Srxlev represents the receiving power value selected by the cell, and the Squal represents the quality of the received signal value selected by the cell. For example, one of the S criteria in the related art is as follows:

Srxlev=Qrxlevmeas−Qrxlevmin

Squal=Qqualmeas−Qqualmin

In the above formula, Qrxlevmeas represents the receiving power value measured by the terminal, and the value is the measured RSRP (dBm). Qrxlevmin represents the minimum receiving power value required by the cell, which is usually indicated in the q-RxLevMin (dBm) of the system information block 1 (SIB1). Qqualmeas indicates the measured EC/NO value of the cell. Qqualmin indicates the EC/NO value required by the cell, which can usually be read by SIB3. EC/NO is configured to indicate the Signal to Interference plus Noise Ratio.

According to 3GPP TS36.304, for LTE terminals, a reselection measurement is not required in the case that Srxlev>SIntraSearchP and Squal>SIntraSearchQ. For Narrow Band Internet of Things (NB-IoT) terminals, in the case that Srxlev>SIntraSearchP, a reselection measurement is not required.

The above criteria may also be referred to as an initializing measurement judgement of the reselection.

The reselection thresholds SIntraSearchP and SIntraSearchQ are thresholds of the base station's broadcast of the same-frequency cell search by the broadcast message (SIB3), 's-IntraSearchP-r9'='ReselectionThreshold' is (0 to 31 integer)×2 [dB], and 's-IntraSearchQ-r9'='ReselectionThresholdQ-r9' takes a value of (0 to 31 integer) [dB].

To be Specific:
1>ReselectionThreshold
The IE ReselectionThreshold is used to indicate an Rx level threshold for cell reselection. Actual value of threshold=field value×2 [dB].

ReselectionThreshold information element
—ASN1START
ReselectionThreshold::=INTEGER (0 . . . 31)
—ASN1STOP
2>ReselectionThresholdQ
The IE ReselectionThresholdQ is used to indicate a quality level threshold for cell reselection. Actual value of threshold=field value [dB].
ReselectionThresholdQ information element
—ASN1 START
ReselectionThresholdQ-r9::=INTEGER (0 . . . 31)
—ASN1 STOP It can be seen that the values of the above-mentioned reselection thresholds SIntraSearchP and SIntraSearchQ are 0 to 62 dB and 0 to 31 dB, respectively. The reselection threshold SintrasearchP has a relatively small value range. In actual use, it is easy to cause the power to exceed the range that triggers the reselection since the base stations are too close to each other or some base stations have a large power. At this time, even if the terminal has moved to the vicinity of a neighboring base station, the intra-frequency measurement will not be triggered and the neighboring area cannot be reselected.

SUMMARY

The present disclosure is to provide a method of triggering an intra-frequency measurement of a terminal, a device of triggering an intra-frequency measurement of a terminal, a terminal and a base station, so as to expand parameter information sent by the base station for determining whether to trigger the intra-frequency measurement, thereby characterizing large value range and enabling the terminal to trigger the intra-frequency measurement timely.

A method of triggering an intra-frequency measurement of a terminal is provided in the present disclosure, including:
acquiring parameter information sent by a base station and configured to determine whether to trigger an intra-frequency measurement;
determining whether to perform the intra-frequency measurement based on the parameter information.

Optionally, the parameter information includes one or more of:
transmission power information of the base station;
first threshold value information and supplementary information of the first threshold value information which are configured to be compared with a receiving power of the terminal;
second threshold value information configured to be compared with a quality of a received signal of the terminal; and
third threshold value information configured to be compared with a received Signal to Interference plus Noise Ratio of the terminal.

Optionally, the parameter information is the first threshold value information and the supplementary information of the first threshold value information which are configured to be compared with the receiving power of the terminal, and the determining whether to perform the intra-frequency measurement based on the parameter information includes:
acquiring, based on the first threshold value information and the supplementary information of the first threshold value information, a first value configured to be compared with the receiving power of the terminal; and
determining whether to perform the intra-frequency measurement based on the first value and the receiving power of the terminal.

Optionally, the determining whether to perform the intra-frequency measurement based on the first value and the receiving power of the terminal includes:

in the case that the receiving power of the terminal is greater than the first value, determining that the intra-frequency measurement is not to be performed by the terminal; and in the case that the receiving power of the terminal is not greater than the first value, determining that the intra-frequency measurement is to be performed by the terminal.

Optionally, the parameter information includes the first threshold value information and the supplementary information of the first threshold value information which are configured to be compared with the receiving power of the terminal and the second threshold value information configured to be compared with the quality of the received signal of the terminal, and the determining whether to perform the intra-frequency measurement based on the parameter information includes:

acquiring, based on the first threshold value information and the supplementary information of the first threshold value information, a first value configured to be compared with the receiving power of the terminal, and obtaining a second value based on the second threshold value information;

comparing the receiving power of the terminal with the first value, and comparing the quality of the received signal of the terminal with the second value;

in the case that the receiving power of the terminal is greater than the first value and the quality of the received signal of the terminal is greater than the second value, determining that the intra-frequency measurement is not to be performed by the terminal; and in the case that the receiving power of the terminal is not greater than the first value or the quality of the received signal of the terminal is not greater than the second value, determining that the intra-frequency measurement is to be performed by the terminal.

Optionally, the parameter information includes the first threshold value information and the supplementary information of the first threshold value information which are configured to be compared with the receiving power of the terminal and the third threshold value information configured to be compared with the received Signal to Interference plus Noise Ratio of the terminal, and the determining whether to perform the intra-frequency measurement based on the parameter information includes:

acquiring, based on the first threshold value information and the supplementary information of the first threshold value information, a first value configured to be compared with the receiving power of the terminal, and obtaining a third value based on the third threshold value information;

comparing the receiving power of the terminal with the first value, and comparing the received Signal to Interference plus Noise Ratio of the terminal with the third value;

in the case that the receiving power of the terminal is greater than the first value and the received Signal to Interference plus Noise Ratio of the terminal is greater than the third value, determining that the intra-frequency measurement is not to be performed by the terminal; and in the case that the receiving power of the terminal is not greater than the first value or the received Signal to Interference plus Noise Ratio of the terminal is not greater than the third value, determining that the intra-frequency measurement is to be performed by the terminal.

Optionally, the parameter information includes the transmission power information of the base station and the first threshold value information and the supplementary information of the first threshold value information which are configured to be compared with the receiving power of the terminal, and the determining whether to perform the intra-frequency measurement based on the parameter information includes:

acquiring, based on the transmission power information of the base station and the first threshold value information and the supplementary information of the first threshold value information, a fourth value configured to be compared with the receiving power of the terminal;

comparing the receiving power of the terminal with the fourth value;

in the case that the receiving power of the terminal is greater than the fourth value, determining that the intra-frequency measurement is not to be performed by the terminal; and in the case that the receiving power of the terminal is not greater than the fourth value, determining that the intra-frequency measurement is to be performed by the terminal.

Optionally, the parameter information includes the transmission power information of the base station, the first threshold value information and the supplementary information of the first threshold value information which are configured to be compared with the receiving power of the terminal and the second threshold value information configured to be compared with the quality of the received signal of the terminal, and the determining whether to perform the intra-frequency measurement based on the parameter information includes:

acquiring, based on the transmission power information of the base station and the first threshold value information and the supplementary information of the first threshold value information, a fourth value configured to be compared with the receiving power of the terminal, and obtaining a second value based on the second threshold value information;

comparing the receiving power of the terminal with the fourth value, and comparing the quality of the received signal of the terminal with the second value;

in the case that the receiving power of the terminal is greater than the fourth value and the quality of the received signal of the terminal is greater than the second value, determining that the intra-frequency measurement is not to be performed by the terminal; and in the case that the receiving power of the terminal is not greater than the fourth value or the quality of the received signal of the terminal is not greater than the second value, determining that the intra-frequency measurement is to be performed by the terminal.

Optionally, the parameter information includes the transmission power information of the base station, the first threshold value information and the supplementary information of the first threshold value information which are configured to be compared with the receiving power of the terminal and the third threshold value information configured to be compared with the received Signal to Interference plus Noise Ratio of the terminal, and the determining whether to perform the intra-frequency measurement based on the parameter information includes:

acquiring, based on the transmission power information of the base station and the first threshold value information and the supplementary information of the first threshold value information, a fourth value configured to be compared with the receiving power of the terminal, and obtaining a third value based on the third threshold value information;

comparing the receiving power of the terminal with the fourth value, and comparing the received Signal to Interference plus Noise Ratio of the terminal with the third value;

in the case that the receiving power of the terminal is greater than the fourth value and the received Signal to Interference plus Noise Ratio of the terminal is greater than the third value, determining that the intra-frequency measurement is not to be performed by the terminal; and in the case that the receiving power of the terminal is not greater than the first value or the received Signal to Interference plus Noise Ratio of the terminal is not greater than the third value, determining that the intra-frequency measurement is to be performed by the terminal.

A device of triggering an intra-frequency measurement of a terminal is further provided in the present disclosure, including:

a parameter acquiring unit, configured to acquire parameter information sent by a base station and configured to determine whether to trigger an intra-frequency measurement; and a measurement decision unit, configured to determine whether to perform the intra-frequency measurement based on the parameter information.

Optionally, the parameter information includes one or more of:

transmission power information of the base station;

first threshold value information and supplementary information of the first threshold value information which are configured to be compared with a receiving power of the terminal;

second threshold value information configured to be compared with a quality of a received signal of the terminal; and third threshold value information configured to be compared with a received Signal to Interference plus Noise Ratio of the terminal.

Optionally, the parameter information is the first threshold value information and the supplementary information of the first threshold value information which are configured to be compared with the receiving power of the terminal, and the measurement decision unit includes:

a first acquiring unit, configured to acquire, based on the first threshold value information and the supplementary information of the first threshold value information, a first value configured to be compared with the receiving power of the terminal;

a first determining unit, configured to determine whether to perform the intra-frequency measurement based on the first value and the receiving power of the terminal.

Optionally, the first determining unit includes:

a first output unit, configured to, in the case that the receiving power of the terminal is greater than the first value, determine that the intra-frequency measurement is not to be performed by the terminal;

a second output unit, configured to, in the case that the receiving power of the terminal is not greater than the first value, determining that the intra-frequency measurement is to be performed by the terminal.

Optionally, the parameter information includes the first threshold value information and the supplementary information of the first threshold value information which are configured to be compared with the receiving power of the terminal and the second threshold value information configured to be compared with the quality of the received signal of the terminal, and the measurement decision unit includes:

a second acquiring unit, configured to acquire, based on the first threshold value information and the supplementary information of the first threshold value information, a first value configured to be compared with the receiving power of the terminal, and obtain a second value based on the second threshold value information;

a second determining unit, configured to:

compare the receiving power of the terminal with the first value, and compare the quality of the received signal of the terminal with the second value;

in the case that the receiving power of the terminal is greater than the first value and the quality of the received signal of the terminal is greater than the second value, determine that the intra-frequency measurement is not to be performed by the terminal; and in the case that the receiving power of the terminal is not greater than the first value or the quality of the received signal of the terminal is not greater than the second value, determine that the intra-frequency measurement is to be performed by the terminal.

Optionally, the parameter information includes the first threshold value information and the supplementary information of the first threshold value information which are configured to be compared with the receiving power of the terminal and the third threshold value information configured to be compared with the received Signal to Interference plus Noise Ratio of the terminal, and the measurement decision unit includes:

a third acquiring unit, configured to acquire, based on the first threshold value information and the supplementary information of the first threshold value information, a first value configured to be compared with the receiving power of the terminal, obtain a second value based on the second threshold value information, and obtain a third value based on the third threshold value information;

a third determining unit, configured to:

compare the receiving power of the terminal with the first value, and compare the received Signal to Interference plus Noise Ratio of the terminal with the third value;

in the case that the receiving power of the terminal is greater than the first value and the received Signal to Interference plus Noise Ratio of the terminal is greater than the third value, determine that the intra-frequency measurement is not to be performed by the terminal; and in the case that the receiving power of the terminal is not greater than the first value or the received Signal to Interference plus Noise Ratio of the terminal is not greater than the third value, determine that the intra-frequency measurement is to be performed by the terminal.

Optionally, the parameter information includes the transmission power information of the base station and the first threshold value information and the supplementary information of the first threshold value information which are configured to be compared with the receiving power of the terminal, and the measurement decision unit includes:

a fourth acquiring unit, configured to acquire, based on the transmission power information of the base station and the first threshold value information and the supplementary information of the first threshold value information, a fourth value configured to be compared with the receiving power of the terminal;

a fourth determining unit, configured to:

compare the receiving power of the terminal with the fourth value;

in the case that the receiving power of the terminal is greater than the fourth value, determine that the intra-frequency measurement is not to be performed by the terminal; and in the case that the receiving power of the terminal is not greater than the fourth value, determine that the intra-frequency measurement is to be performed by the terminal.

Optionally, the parameter information includes the transmission power information of the base station, the first threshold value information and the supplementary information of the first threshold value information which are configured to be compared with the receiving power of the terminal and the second threshold value information configured to be compared with the quality of the received signal of the terminal, and the measurement decision unit includes:

a fifth acquiring unit, configured to acquire, based on the transmission power information of the base station and the first threshold value information and the supplementary information of the first threshold value information, a fourth value configured to be compared with the receiving power of the terminal, and obtain a second value based on the second threshold value information;

a fifth determining unit, configured to:

compare the receiving power of the terminal with the fourth value, and compare the quality of the received signal of the terminal with the second value;

in the case that the receiving power of the terminal is greater than the fourth value and the quality of the received signal of the terminal is greater than the second value, determine that the intra-frequency measurement is not to be performed by the terminal; and in the case that the receiving power of the terminal is not greater than the fourth value or the quality of the received signal of the terminal is not greater than the second value, determine that the intra-frequency measurement is to be performed by the terminal.

Optionally, the parameter information includes the transmission power information of the base station, the first threshold value information and the supplementary information of the first threshold value information which are configured to be compared with the receiving power of the terminal and the third threshold value information configured to be compared with the received Signal to Interference plus Noise Ratio of the terminal, and the measurement decision unit includes:

a sixth acquiring unit, configured to acquire, based on the transmission power information of the base station and the first threshold value information and the supplementary information of the first threshold value information, a fourth value configured to be compared with the receiving power of the terminal, and obtain a third value based on the third threshold value information;

a sixth determining unit, configured to:

compare the receiving power of the terminal with the fourth value, and compare the received Signal to Interference plus Noise Ratio of the terminal with the third value;

in the case that the receiving power of the terminal is greater than the fourth value and the received Signal to Interference plus Noise Ratio of the terminal is greater than the third value, determine that the intra-frequency measurement is not to be performed by the terminal; and in the case that the receiving power of the terminal is not greater than the first value or the received Signal to Interference plus Noise Ratio of the terminal is not greater than the third value, determine that the intra-frequency measurement is to be performed by the terminal.

A terminal is further provided in the present disclosure, including: one or more processors, a memory and one or more programs, where the one or more programs are stored in the memory and configured to be executed by the one or more processors, where the programs are executed to perform the method of triggering an intra-frequency measurement of a terminal hereinabove.

A method of triggering an intra-frequency measurement of a terminal is further provided in the present disclosure, including:

determining, by a base station, parameter information configured to determine whether to trigger the intra-frequency measurement of the terminal; and transmitting, by the base station, the parameter information configured to determine whether to trigger the intra-frequency measurement of the terminal to the terminal.

Optionally, the parameter information includes one or more of:

transmission power information of the base station;

first threshold value information and supplementary information of the first threshold value information which are configured to be compared with a receiving power of the terminal, where the first threshold value information and the supplementary information of the first threshold value information together constitute a field corresponding to a new threshold value, or the first threshold value information represents a reference threshold configured to be compared with the receiving power of the terminal and the supplementary information of the first threshold value information represents a reference transmission power of the base station corresponding to the reference threshold;

second threshold value information configured to be compared with a quality of a received signal of the terminal; and third threshold value information configured to be compared with a received Signal to Interference plus Noise Ratio of the terminal.

A device of triggering an intra-frequency measurement of a terminal is further provided in the present disclosure, including:

a determining unit, configured to determine parameter information configured to determine whether to trigger the intra-frequency measurement of the terminal; and a transmitting unit, configured to transmit the parameter information configured to determine whether to trigger the intra-frequency measurement of the terminal to the terminal.

Optionally, the parameter information includes one or more of:

transmission power information of the base station;

first threshold value information and supplementary information of the first threshold value information which are configured to be compared with a receiving power of the terminal, where the first threshold value information and the supplementary information of the first threshold value information together constitute a field corresponding to a new threshold value, or the first threshold value information represents a reference threshold configured to be compared with the receiving power of the terminal and the supplementary information of the first threshold value information represents a reference transmission power of the base station corresponding to the reference threshold;

second threshold value information configured to be compared with a quality of a received signal of the terminal; and third threshold value information configured to be compared with a received Signal to Interference plus Noise Ratio of the terminal.

A non-volatile computer-readable storage medium is further provided in the present disclosure, where computer-readable instructions executable by a processor are stored in the non-volatile computer-readable storage medium, the processor executes the computer-readable instructions to:

acquire parameter information sent by a base station and configured to determine whether to trigger an intra-frequency measurement, and determine whether to perform the intra-frequency measurement based on the parameter information.

An intra-frequency measurement triggering device is further provided in the present disclosure, including: a processor, a transceiver and a memory, where the processor is configured to read a program in the memory to:

determine parameter information configured to determine whether to trigger the intra-frequency measurement of the terminal;

transmit the parameter information configured to determine whether to trigger the intra-frequency measurement of the terminal to the terminal;

where the transceiver is configured to receive and send data, and the memory is configured to store data used by the processor to perform an operation.

A non-volatile computer-readable storage medium is further provided in the present disclosure, where computer-readable instructions executable by a processor are stored in the non-volatile computer-readable storage medium, the processor executes the computer-readable instructions to:

determine parameter information configured to determine whether to trigger the intra-frequency measurement of the terminal, and transmit the parameter information configured to determine whether to trigger the intra-frequency measurement of the terminal to the terminal.

According to the method of triggering an intra-frequency measurement of a terminal, the device of triggering an intra-frequency measurement of a terminal, the terminal and the base station, the terminal is able to dynamically adjust the mobility parameter, so that the mobility control may be performed in time, such as performing the cell reselection or switch in time to get a better quality network service. In addition, the terminal is able to adjust the mobility parameter autonomously according to the mobility parameter adjustment information of the base station, thereby implementing a flexible mobility control processing.

BRIEF DESCRIPTION OF THE DRAWINGS

In order to more clearly illustrate the technical solutions of the embodiments of the present disclosure, the drawings to be used in the description of the embodiments of the present disclosure will be briefly described below. It is obvious that the drawings in the following description are only some embodiments of the present disclosure. Other drawings may also be obtained from those of ordinary skill in the art based on these drawings without the inventive labor.

FIG. 3 is another flowchart of a method for triggering an intra-frequency measurement of a terminal in some embodiments of the present disclosure;

FIG. 4 is another flowchart of a method for triggering an intra-frequency measurement of a terminal in some embodiments of the present disclosure;

FIG. 6 is another flowchart of a method for triggering an intra-frequency measurement of a terminal in some embodiments of the present disclosure;

FIG. 7 is another flowchart of a method for triggering an intra-frequency measurement of a terminal in some embodiments of the present disclosure;

DETAILED DESCRIPTION

In order to make the technical issues, the technical solutions and the advantages of the present disclosure more clear, the present disclosure will be described hereinafter in conjunction with the drawings and embodiments. In the following description, specific details such as specific configurations and components are provided only to assist in a comprehensive understanding of the embodiments of the present disclosure. It will be apparent to those skilled in the art that various changes and modifications may be made to the embodiments described herein without departing from the scope and spirit of the disclosure. In addition, descriptions of well-known functions and constructions are omitted for clarity and conciseness.

It should be understood that the phrase "one embodiment" or "an embodiment" or "an" or "an". Thus, "in one embodiment" or "in an embodiment" or "an". In addition, these particular features, structures, or characteristics may be combined in any suitable manner in one or more embodiments.

In the various embodiments of the present disclosure, it should be understood that the size of the serial numbers of the following processes does not mean the order of execution, and the order of execution of each process should be determined by its function and internal logic, and should not constitutes any limitation to the implementation of the present disclosure.

In the embodiment of the present disclosure, the form of the base station is not limited, and may be a Macro Base Station, a Pico Base Station, a Node B (a name of a 3G mobile base station), an enhanced base station (eNB), and a home enhanced type. Base station (Femto eNB or Home eNode B or Home eNB or HeNB), relay station, access point, RRU (Remote Radio Unit), RRH (Remote Radio Head), 5G mobile communication system Network side nodes, such as a central unit (CU, Central Unit) and a distributed unit (DU, distributed unit). The terminal may be a mobile phone (or cell phone), or other device capable of transmitting or receiving wireless signals, including user equipment (UE), personal digital assistant (PDA), wireless modem, wireless communication device, handheld device, laptop computer, cordless phones, wireless local loop (WLL) stations, CPE (Customer Premise Equipment), mobile smart hotspots, smart home appliances capable of converting mobile signals into WiFi signals, or other equipment able to spontaneously communicate with the mobile communication network without human operation, etc.

Figure 1:
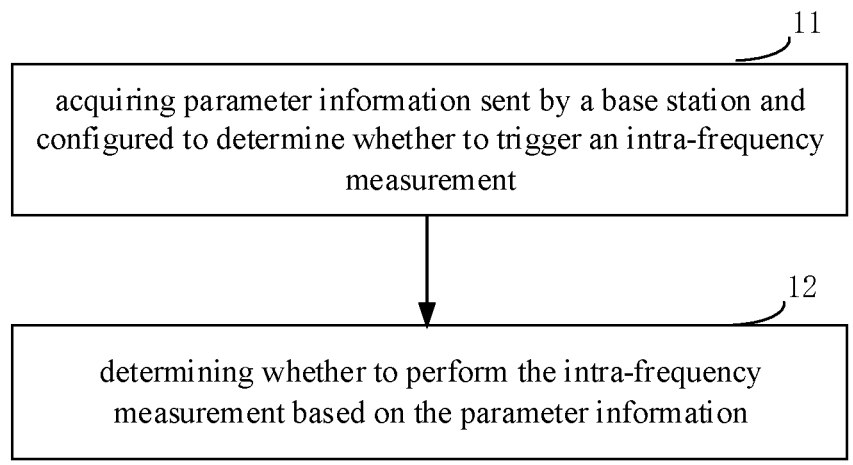
FIG. 1 is a flowchart of a method of triggering an intra-frequency measurement of a terminal in some embodiments of the present disclosure.

Referring to FIG. 1, a method of triggering an intra-frequency measurement of a terminal is provided in some embodiments of the present disclosure. As shown in FIG. 1, the method includes:

Step 11: acquiring parameter information sent by a base station and configured to determine whether to trigger an intra-frequency measurement.

In some embodiments of the present disclosure, the parameter information includes one or more of:

transmission power information of the base station;

first threshold value information and supplementary information of the first threshold value information which are configured to be compared with a receiving power of the terminal;

second threshold value information configured to be compared with a quality of a received signal of the terminal; and third threshold value information configured to be compared with a received Signal to Interference plus Noise Ratio of the terminal.

Here, in some embodiments of the present disclosure, the first threshold value information and the supplementary information of the first threshold value information together constitute a field corresponding to a new threshold value. In some embodiments of the present disclosure, the first threshold value information represents a reference threshold configured to be compared with the receiving power of the terminal, and the supplementary information of the first threshold value information represents a reference transmission power of the base station corresponding to the reference threshold.

Step 12: determining whether to perform the intra-frequency measurement based on the parameter information.

Here, after receiving the parameter information, the terminal may determine a reference value for triggering the intra-frequency measurement based on the parameter information, and determine whether to perform the intra-frequency measurement based on a comparison result between the reference value and the current receiving state of the terminal. Here, the current receiving state of the terminal may include one or more of a receiving power, a quality of a received signal and a received Signal to Interference plus Noise Ratio of the terminal. In the case that it is determined that the intra-frequency measurement may be performed, the measurement process of the intra-frequency neighboring cell may be initiated, and the relevant measurement parameters are obtained and reported to the network for the mobility control.

According to the above steps in some embodiments of the present disclosure, the parameter information sent by the base station and configured to determine whether to trigger the intra-frequency measurement are extended, and the terminal may determine, based on the parameter information, a mobility parameter which may represent a larger value range for the mobility control, such as a cell reselection and a cell handover. Compare with the related art where the base station directly transmits a fixed mobility parameter, according to some embodiments of the present disclosure, the parameter information sent by the base station may be extended, so that he mobility control process may support a larger receiving power range, thereby ensuring that the terminal may perform the cell reselection/handover timely.

In some embodiments of the present disclosure, the parameter information includes one or more of: the transmission power information of the base station, the first threshold value information and the supplementary information of the first threshold value information which are configured to be compared with a receiving power of the terminal, the second threshold value information configured to be compared with the quality of the received signal of the terminal, and the third threshold value information configured to be compared with the received Signal to Interference plus Noise Ratio of the terminal. In some embodiments of the present disclosure, the parameter information sent by the base station may at least include the first threshold value information and the supplementary information of the first threshold value information configured to be compared with the receiving power of the terminal. In some embodiments of the present disclosure, the parameter information sent by the base station may include the first threshold value information and the supplementary information of the first threshold value information only. In some embodiments of the present disclosure, the parameter information may further include one or more of the following information: the transmission power information of the base station, the second threshold value information compared with the quality of the received signal of the terminal, the third threshold value information configured to be compared with the received Signal to Interference plus Noise Ratio of the terminal.

The different contents of the parameter information transmitted by the base station will be described in detail below.

Figure 2:
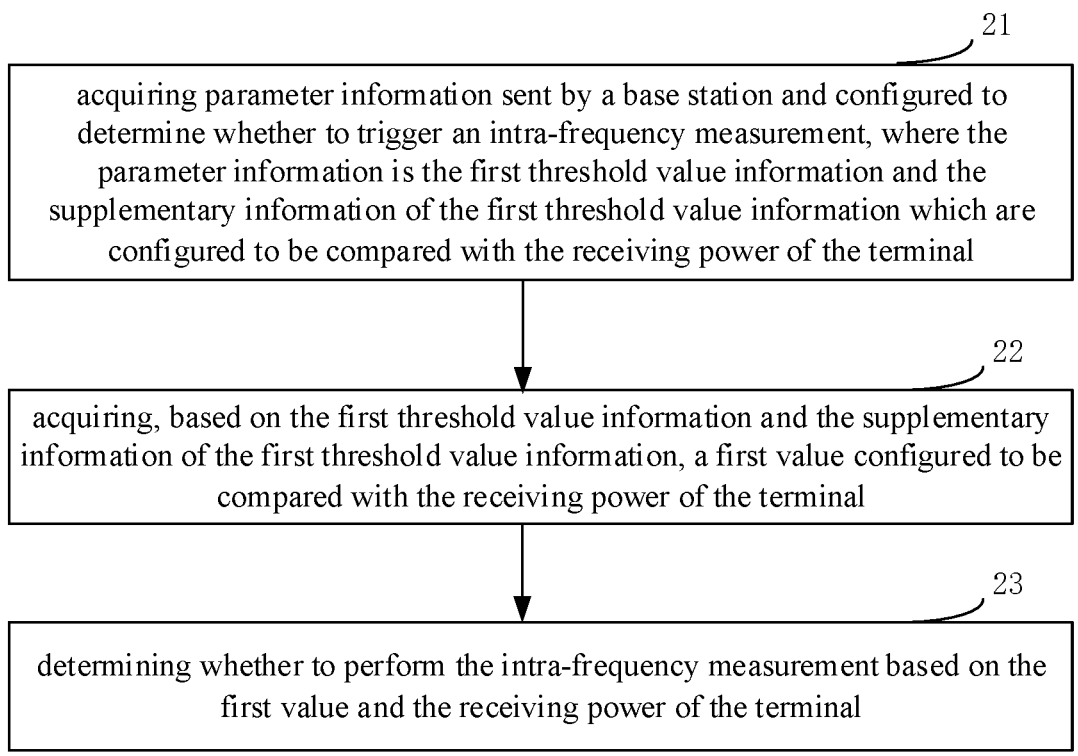
FIG. 2 is another flowchart of a method for triggering an intra-frequency measurement of a terminal in some embodiments of the present disclosure.

Referring to FIG. 2 which is another flowchart of a method for triggering an intra-frequency measurement of a terminal in some embodiments of the present disclosure. The method is applied to a terminal. As shown in FIG. 2, the method includes:

Step 21: acquiring parameter information sent by a base station and configured to determine whether to trigger an intra-frequency measurement, where the parameter information is the first threshold value information and the supplementary information of the first threshold value information which are configured to be compared with the receiving power of the terminal.

Here, the parameter information includes only the first threshold value information and the supplementary information thereof. In order to be compatible with the related art, the first threshold value information may be a power threshold parameter in the related art. For example, the first threshold value information may adopt a SintrasearchP field in the related art. Because the SintrasearchP=ReselectionThreshold is composed of 5 bits, it can represent an integer of (0 . . . 31)×2. In order to obtain a larger range of values, in some embodiments of the present disclosure, the supplemental information of first threshold value information may be introduced in addition to the SintrasearchP, which may include one or more bits. For example, the 5-bits SintrasearchP in the related art plus the 1-bit supplementary information of the first threshold value information, a 6-bits parameter may be obtained, and the parameter may represent an integer of (0 . . . 63)×2.

The above example is only a specific implementation manner of the first threshold value information and the supplementary information. In some embodiments of the present disclosure, other customized manners may also be adopted to define fields and representation manners of the corresponding information, the description thereof is omitted herein.

Step 22: acquiring, based on the first threshold value information and the supplementary information of the first threshold value information, a first value configured to be compared with the receiving power of the terminal.

Here, in some embodiments of the present disclosure, the range of the first threshold value may be extended based on the supplemental information of the first threshold value information. The supplementary information and the first threshold value information may together form a new field, and the first value is determined according to the new field. For example, continuing the previous example, the 1-bit supplementary information of the first threshold value information is added to the 5-bits SintrasearchP (first threshold value information) in the related art, a 6-bits parameter may be obtained, which may represent an integer of (0 . . . 63)×2. Based on the value of the parameter, a first value configured to be compared with the receiving power of the terminal may be obtained.

Step 23: determining whether to perform the intra-frequency measurement based on the first value and the receiving power of the terminal.

After determining the first value, it is able to determine whether to perform a measurement to the intra-frequency neighboring cells based on the first value and the measurement result of the current receiving power of the terminal. Specifically, in the case that the receiving power of the terminal is greater than the first value, it is determined that the terminal may not perform the intra-frequency measurement; in the case that the receiving power of the terminal is not greater than the first value, it is determined that the terminal may perform the intra-frequency measurement.

In some embodiments of the present disclosure, the first threshold value information and the supplemental information thereof are taken as an example, to describe an embodiment of the present disclosure. In this embodiment, the range of values that can be characterized by the first threshold value information is extended by the supplementary information, to support a larger power threshold range, thereby avoiding the failure of triggering the mobility process when the power exceeds the measuring range of triggering the mobility process (e.g., the cell reselection).

Referring to FIG. 3 which is another flowchart of a method for triggering an intra-frequency measurement of a terminal in some embodiments of the present disclosure. The method is applied to a terminal. As shown in FIG. 3, the method includes:

Step 31: acquiring parameter information sent by a base station and configured to determine whether to trigger an intra-frequency measurement, where the parameter information includes the first threshold value information and the supplementary information of the first threshold value information which are configured to be compared with the receiving power of the terminal and the second threshold value information configured to be compared with the quality of the received signal of the terminal.

Here, the parameter information only includes the first threshold value information and the supplementary information thereof, and the second threshold value information. Similarly, in order to be compatible with the related art, the first threshold value information may adopt a power threshold parameter in the related art. For example, the first threshold value information adopts a SintrasearchP field in the related art. Since SintrasearchP=ReselectionThreshold is composed of 5 bits, it can represent an integer of (0 . . . 31)×2. In order to obtain a larger range of value, in some embodiments of the present disclosure, the supplemental information of the first threshold value information may be introduced in addition to the SintrasearchP, which may include one or more bits. For example, the 5-bits SintrasearchP in the related art plus the 1-bit supplementary information of the first threshold value information, a 6-bits parameter may be obtained, and the parameter may represent an integer of (0 . . . 63)×2. The second threshold value information may adopt a SintrasearchQ field in the related art, that is, a threshold of the RSRQ.

The above example is only a specific implementation manner of the first threshold value information and the supplementary information. In some embodiments of the present disclosure, other customized manners may also be adopted to define fields and representation manners of the corresponding information, the description thereof is omitted herein.

Step 32: acquiring, based on the first threshold value information and the supplementary information of the first threshold value information, a first value configured to be compared with the receiving power of the terminal, and obtaining a second value based on the second threshold value information.

Here, in some embodiments of the present disclosure, the range of the first threshold value may be extended based on the supplemental information of the first threshold value information. The supplementary information and the first threshold value information may together form a new field, and the first value is determined according to the new field. For example, continuing the previous example, the 1-bit supplementary information of the first threshold value information is added to the 5-bits SintrasearchP (first threshold value information) in the related art, a 6-bits parameter may be obtained, which may represent an integer of (0 . . . 63)×2. Based on the value of the parameter, a first value configured to be compared with the receiving power of the terminal may be obtained. In addition, the second value is obtained according to the specific value carried in the second threshold value information.

Step 33: determining whether to perform the intra-frequency measurement based on the first value, the second value, the receiving power of the terminal, and the quality of the received signal of the terminal.

Here, in particular, the receiving power of the terminal may be compared with the first value, and the quality of the received signal of the terminal is compared with the second value. In the case that the receiving power of the terminal is greater than the first value, and the quality of the received signal of the terminal is greater than the second value, it is determined that the terminal may not perform the intra-frequency measurement. In the case that the terminal receiving power is not greater than the first value or the quality of the received signal of the terminal is not greater than the second value, it is determined that the terminal may perform the intra-frequency measurement.

In some embodiments of the present disclosure, the first threshold value information and the supplemental information thereof and the second threshold value information are taken as an example, to describe an embodiment of the present disclosure. In this embodiment, the range of values that can be characterized by the first threshold value information is extended by the supplementary information, to support a larger power threshold range, thereby avoiding the failure of triggering the mobility process when the power exceeds the measuring range of triggering the mobility process (e.g., the cell reselection). In some embodiments of the present disclosure, the second threshold value information is also introduced to be compared with the quality of the received signal of the terminal. Based on the comparison result between the receiving power and the first value and the comparison result between the quality of the received signal and the second value, whether to perform the intra-frequency measurement is determined.

Referring to FIG. 4 which is another flowchart of a method for triggering an intra-frequency measurement of a terminal in some embodiments of the present disclosure. The method is applied to a terminal. As shown in FIG. 4, the method includes:

Step 41: acquiring parameter information sent by a base station and configured to determine whether to trigger an intra-frequency measurement, where the parameter information includes the first threshold value information and the supplementary information of the first threshold value information which are configured to be compared with the receiving power of the terminal and the third threshold value information configured to be compared with the received Signal to Interference plus Noise Ratio of the terminal.

Here, the parameter information only includes the first threshold value information and the supplementary information thereof, and the second threshold value information. Similarly, in order to be compatible with the related art, the first threshold value information may adopt a power threshold parameter in the related art. For example, the first threshold value information adopts a SintrasearchP field in the related art. Since SintrasearchP=ReselectionThreshold is composed of 5 bits, it can represent an integer of (0 . . . 31)×2. In order to obtain a larger range of value, in some embodiments of the present disclosure, the supplemental information of the first threshold value information may be introduced in addition to the SintrasearchP, which may include one or more bits. For example, the 5-bits SintrasearchP in the related art plus the 1-bit supplementary information of the first threshold value information, a 6-bits parameter may be obtained, and the parameter may represent an integer of (0 . . . 63)×2. The third threshold value information may be threshold information of the SINR determined and delivered by the network side.

The above example is only a specific implementation manner of the first threshold value information and the supplementary information and the second threshold value information. In some embodiments of the present disclosure, other customized manners may also be adopted to define fields and representation manners of the corresponding information, the description thereof is omitted herein.

Step 42: acquiring, based on the first threshold value information and the supplementary information of the first threshold value information, a first value configured to be compared with the receiving power of the terminal, and obtaining a third value based on the third threshold value information.

Here, in some embodiments of the present disclosure, the range of the first threshold value may be extended based on the supplemental information of the first threshold value information. The supplementary information and the first threshold value information may together form a new field, and the first value is determined according to the new field. For example, continuing the previous example, the 1-bit supplementary information of the first threshold value information is added to the 5-bits SintrasearchP (first threshold value information) in the related art, a 6-bits parameter may be obtained, which may represent an integer of (0 . . . 63)×2. Based on the value of the parameter, a first value configured to be compared with the receiving power of the terminal may be obtained. In addition, the third value is obtained according to the specific value carried in the third threshold value information.

Step 43: determining whether to perform the intra-frequency measurement based on the first value, the third value, the receiving power of the terminal and the received Signal to Interference plus Noise Ratio of the terminal.

Here, in particular, the receiving power of the terminal are compared with the first value, and the received Signal to Interference plus Noise Ratio of the terminal are compared with the third value. In the case that the receiving power of the terminal is greater than the first value, and the received Signal to Interference plus Noise Ratio of the terminal is greater than the third value, it is determined that the terminal may not perform the intra-frequency measurement. In the case that the receiving power of the terminal is not greater than the first value or the received Signal to Interference plus Noise Ratio of the terminal is not greater than the third value, it is determined that the terminal may perform the intra-frequency measurement.

In some embodiments of the present disclosure, the first threshold value information and the supplemental information thereof and the third threshold value information are taken as an example, to describe an embodiment of the present disclosure. In this embodiment, the range of values that can be characterized by the first threshold value information is extended by the supplementary information, to support a larger power threshold range, thereby avoiding the failure of triggering the mobility process when the power exceeds the measuring range of triggering the mobility process (e.g., the cell reselection). In some embodiments of the present disclosure, the third threshold value information is also introduced to be compared with the received Signal to Interference plus Noise Ratio of the terminal. Based on the comparison result between the receiving power and the first value and comparison result between the received Signal to Interference plus Noise Ratio of the terminal and the third value, whether to perform the intra-frequency measurement is determined.

Figure 5:
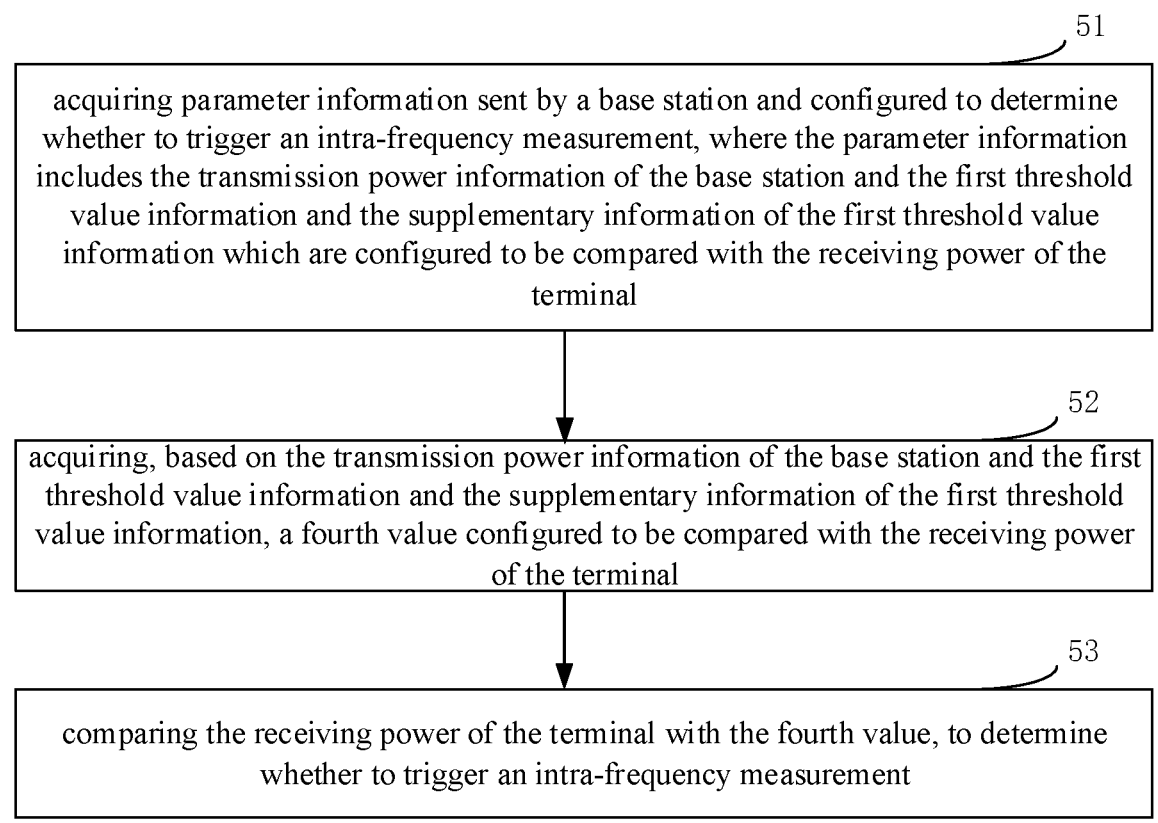
FIG. 5 is another flowchart of a method for triggering an intra-frequency measurement of a terminal in some embodiments of the present disclosure.

Referring to FIG. 5 which is another flowchart of a method for triggering an intra-frequency measurement of a terminal in some embodiments of the present disclosure. The method is applied to a terminal. As shown in FIG. 5, the method includes:

Step 51: acquiring parameter information sent by a base station and configured to determine whether to trigger an intra-frequency measurement, where the parameter information includes the transmission power information of the base station and the first threshold value information and the supplementary information of the first threshold value information which are configured to be compared with the receiving power of the terminal.

Here, the terminal acquires the actual transmission power information of the base station, and first threshold value information and supplementary information thereof. The first threshold value information represents a reference threshold configured to be compared with the receiving power, and the supplementary information of the first threshold value information represents the reference transmission power of the base station corresponding to the reference threshold, that is, in the case that the transmission power of the base station is the reference transmission power, the reference threshold configured to be compared with the receiving power is the value carried in the first threshold value information.

Here, the transmission power information of the base station may be obtained from the broadcast information sent by the base station to indicate the actual transmission power of the base station. For example, the base station may carry its transmission power information in a system message for broadcast transmission, and the terminal may acquire the transmission power information of the base station from the system message broadcasted by the base station. Specifically, the transmission power information of the base station may be carried in the 'referenceSignalPower' in the 'PDSCH-Config' message in the system information block 2

(SIB 2), and the value range of the 'referenceSignalPower' may be −60 to 50, which may identify a larger range of transmission power. The 'PDSCH-Config' information element (IE) is defined as follows, including referenceSignalPower:

```
PDSCH-Config information element
PDSCH-ConfigCommon ::=    SEQUENCE {
referenceSignalPower      INTEGER (-60..50),
p-b                       INTEGER (0..3)
}
```

The above example is only one implementation manner in which the base station notifies the transmission power. In addition, the base station may transmit the transmission power information through other system messages or dedicated signaling (such as RRC signaling).

The first threshold value information and the supplementary information of the first threshold value information configured to be compared with the receiving power of the terminal may be sent by the base station to the terminal through a broadcast message or a predetermined signaling message (such as an RRC signaling message). Of course, the first threshold value information and the supplementary information thereof may also be pre-configured at the terminal side.

Step 52: acquiring, based on the transmission power information of the base station and the first threshold value information and the supplementary information of the first threshold value information, a fourth value configured to be compared with the receiving power of the terminal.

Here, the actual threshold corresponding to the actual transmission power information of the base station is determined based on the reference transmission power and the reference threshold indicated by the first threshold value information and the supplementary information thereof, so as to obtain the fourth value. Specifically, an offset of the transmission power information of the base station relative to the supplemental information of the first threshold value information may be calculated, and then the first threshold value information is adjusted according to the offset, so as to obtain the fourth value.

For example, the network broadcast that the actual transmission power of the base station is 32.2 dBm, the value indicated by the first threshold value information is 60 dB, and the value indicated by the supplementary information of the first threshold value information is 15.2 dBm (i.e., the base station adopts the transmission power of 15.2 dBm, and then threshold applicable to the terminal is 60 dB at this time). Therefore, when the actual transmission power of the base station is 32.2 dBm, the threshold value applicable to the terminal is =60 dB+(32.2 dBm-15.2 dBm)=77 dB, that is, the fourth value is 77 dB.

Step 53: comparing the receiving power of the terminal with the fourth value, to determine whether to trigger an intra-frequency measurement.

Here, specifically, in the case that the receiving power of the terminal is greater than the fourth value, it is determined that the terminal may not perform the intra-frequency measurement; in the case that the receiving power of the terminal is not greater than the fourth value, it is determined that the terminal may perform the intra-frequency measurement.

In some embodiments of the present disclosure, the first threshold value information and the supplemental information thereof and the transmission power of the base station are taken as an example, to describe an embodiment of the present disclosure. In this embodiment, based on the first threshold value information and the supplementary information thereof sent by the base station, the base station may enable the terminal to adjust the threshold value indicated by the first threshold value information based on the current receiving power, thus it is able to dynamically adjust the threshold based on the actual transmission power of the base station, and then the mobility parameter may be dynamically adjusted to trigger the mobility process of the terminal timely.

Referring to FIG. 6 which is another flowchart of a method for triggering an intra-frequency measurement of a terminal in some embodiments of the present disclosure. The method is applied to a terminal. As shown in FIG. 6, the method includes:

Step 61: acquiring parameter information sent by a base station and configured to determine whether to trigger an intra-frequency measurement, where the parameter information includes the transmission power information of the base station, the first threshold value information and the supplementary information of the first threshold value information which are configured to be compared with the receiving power of the terminal and the second threshold value information configured to be compared with the quality of the received signal of the terminal.

Here, the terminal acquires the actual transmission power information of the base station, and first threshold value information and supplementary information thereof. The first threshold value information represents a reference threshold configured to be compared with the receiving power, and the supplementary information of the first threshold value information represents the reference transmission power of the base station corresponding to the reference threshold, that is, in the case that the transmission power of the base station is the reference transmission power, the reference threshold configured to be compared with the receiving power is the value carried in the first threshold value information.

Here, the transmission power information of the base station may be obtained from the broadcast information sent by the base station to indicate the actual transmission power of the base station.

Here, the second threshold value information may be a SintrasearchQ field in the related art, that is, a threshold value of the RSRQ.

Step 62: acquiring, based on the transmission power information of the base station and the first threshold value information and the supplementary information of the first threshold value information, a fourth value configured to be compared with the receiving power of the terminal, and obtaining a second value based on the second threshold value information.

Here, the actual threshold corresponding to the actual transmission power information of the base station is determined based on the reference transmission power and the reference threshold indicated by the first threshold value information and the supplementary information thereof, so as to obtain the fourth value. Specifically, an offset of the transmission power information of the base station relative to the supplemental information of the first threshold value information may be calculated, and then the first threshold value information is adjusted according to the offset, so as to obtain the fourth value. In addition, the second value is obtained according to the specific value carried in the second threshold value information.

Step 63: comparing the receiving power of the terminal with the fourth value, and comparing the quality of the received signal of the terminal with the second value, to determine whether to perform the intra-frequency measurement.

Here, in the case that the receiving power of the terminal is greater than the fourth value, and the quality of the received signal of the terminal is greater than the second value, it is determined that the terminal may not perform the intra-frequency measurement; in the case that the receiving power of the terminal is not greater than the fourth value or the quality of the received signal of the terminal is not greater than the second value, it is determined that the terminal may perform the intra-frequency measurement.

In some embodiments of the present disclosure, the first threshold value information and the supplemental information thereof and the transmission power of the base station and the second threshold value information configured to be compared with the quality of the received signal of the terminal are taken as an example, to describe an embodiment of the present disclosure. In this embodiment, based on the first threshold value information and the supplementary information thereof sent by the base station, the base station may enable the terminal to adjust the threshold value indicated by the first threshold value information based on the current receiving power, thus it is able to dynamically adjust the threshold based on the actual transmission power of the base station, and then the mobility parameter may be dynamically adjusted to trigger the mobility process of the terminal timely. In some embodiments of the present disclosure, the second threshold value information is also introduced to be compared with the quality of the received signal of the terminal. Based on the comparison result between the receiving power and the first value and the comparison result between the quality of the received signal and the second value, whether to perform the intra-frequency measurement is determined.

Referring to FIG. 7 which is another flowchart of a method for triggering an intra-frequency measurement of a terminal in some embodiments of the present disclosure. The method is applied to a terminal. As shown in FIG. 7, the method includes:

Step 71: acquiring parameter information sent by a base station and configured to determine whether to trigger an intra-frequency measurement, where the parameter information includes the transmission power information of the base station, the first threshold value information and the supplementary information of the first threshold value information which are configured to be compared with the receiving power of the terminal and the third threshold value information configured to be compared with the received Signal to Interference plus Noise Ratio of the terminal.

Here, the terminal acquires the actual transmission power information of the base station, and first threshold value information and supplementary information thereof. The first threshold value information represents a reference threshold configured to be compared with the receiving power, and the supplementary information of the first threshold value information represents the reference transmission power of the base station corresponding to the reference threshold, that is, in the case that the transmission power of the base station is the reference transmission power, the reference threshold configured to be compared with the receiving power is the value carried in the first threshold value information.

Here, the transmission power information of the base station may be obtained from the broadcast information sent by the base station to indicate the actual transmission power of the base station. The third threshold value information may be threshold information of the SINR determined and delivered by the network side.

Step 72: acquiring, based on the transmission power information of the base station and the first threshold value information and the supplementary information of the first threshold value information, a fourth value configured to be compared with the receiving power of the terminal, and obtaining a third value based on the third threshold value information.

Here, the actual threshold corresponding to the actual transmission power information of the base station is determined based on the reference transmission power and the reference threshold indicated by the first threshold value information and the supplementary information thereof, so as to obtain the fourth value. Specifically, an offset of the transmission power information of the base station relative to the supplemental information of the first threshold value information may be calculated, and then the first threshold value information is adjusted according to the offset, so as to obtain the fourth value. In addition, the third value is obtained according to the specific value carried in the third threshold value information.

Step 73: comparing the receiving power of the terminal with the fourth value, and comparing the received Signal to Interference plus Noise Ratio of the terminal with the third value, to determine whether to perform the intra-frequency measurement.

Here, in the case that the receiving power of the terminal is greater than the fourth value and the received Signal to Interference plus Noise Ratio of the terminal is greater than the third value, it is determined that the terminal may not perform the intra-frequency measurement; in the case that the receiving power of the terminal is not greater than the first value or the received Signal to Interference plus Noise Ratio of the terminal is not greater than the third value, it is determined that the terminal may perform the intra-frequency measurement.

In some embodiments of the present disclosure, the first threshold value information and the supplemental information thereof and the transmission power of the base station and the second threshold value information configured to be compared with the quality of the received signal of the terminal are taken as an example, to describe an embodiment of the present disclosure. In this embodiment, based on the first threshold value information and the supplementary information thereof sent by the base station, the base station may enable the terminal to adjust the threshold value indicated by the first threshold value information based on the current receiving power, thus it is able to dynamically adjust the threshold based on the actual transmission power of the base station, and then the mobility parameter may be dynamically adjusted to trigger the mobility process of the terminal timely. In some embodiments of the present disclosure, the third threshold value information is also introduced to be compared with the received Signal to Interference plus Noise Ratio of the terminal. Based on the comparison result between the receiving power and the first value and the comparison result between the received Signal to Interference plus Noise Ratio of the terminal and the third value, whether to perform the intra-frequency measurement is determined.

Figure 8:
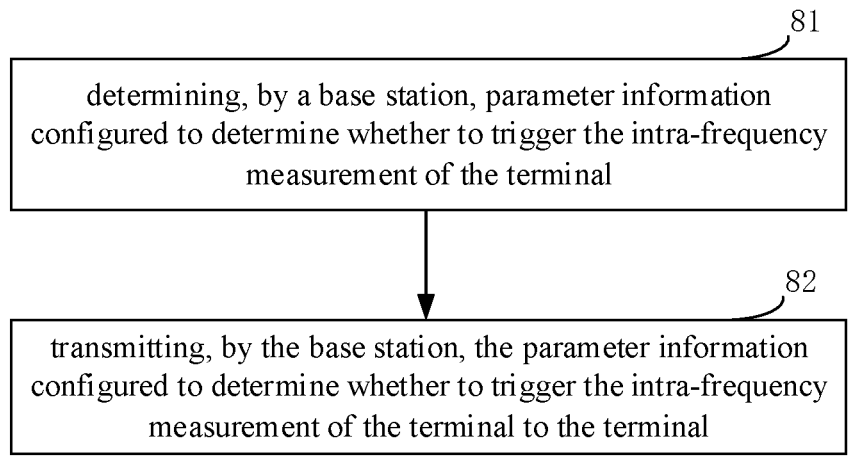
FIG. 8 is another flowchart of a method for triggering the intra-frequency measurement of a terminal in some embodiments of the present disclosure.

Referring to FIG. 8 which is a flowchart of a method for triggering an intra-frequency measurement of a terminal in some embodiments of the present disclosure. The method is applied to a base station. As shown in FIG. 8, the method includes:

Step 81: determining, by a base station, parameter information configured to determine whether to trigger the intra-frequency measurement of the terminal.

The parameter information includes one or more of:

transmission power information of the base station;

first threshold value information and supplementary information of the first threshold value information which are configured to be compared with a receiving power of the terminal, where the first threshold value information and the supplementary information of the first threshold value information together constitute a field corresponding to a new threshold value, or the first threshold value information represents a reference threshold configured to be compared with the receiving power of the terminal and the supplementary information of the first threshold value information represents a reference transmission power of the base station corresponding to the reference threshold;

second threshold value information configured to be compared with a quality of a received signal of the terminal; and third threshold value information configured to be compared with a received Signal to Interference plus Noise Ratio of the terminal.

Step 82: transmitting, by the base station, the parameter information configured to determine whether to trigger the intra-frequency measurement of the terminal to the terminal.

Figure 9:
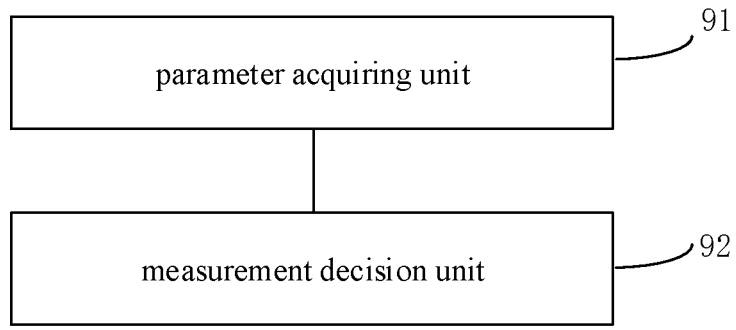
FIG. 9 is a schematic view of a device of triggering an intra-frequency measurement of a terminal in some embodiments of the present disclosure.

Based on the method in some embodiments of the present disclosure, a device of triggering an intra-frequency measurement of a terminal is further provided in some embodiments of the present disclosure, which may be arranged in a terminal. Referring to FIG. 9, the device includes:

a parameter acquiring unit 91, configured to acquire parameter information sent by a base station and configured to determine whether to trigger an intra-frequency measurement; and a measurement decision unit 92, configured to determine whether to perform the intra-frequency measurement based on the parameter information.

Optionally, the parameter information includes one or more of:

transmission power information of the base station;

first threshold value information and supplementary information of the first threshold value information which are configured to be compared with a receiving power of the terminal;

second threshold value information configured to be compared with a quality of a received signal of the terminal; and third threshold value information configured to be compared with a received Signal to Interference plus Noise Ratio of the terminal.

Optionally, the parameter information is the first threshold value information and the supplementary information of the first threshold value information which are configured to be compared with the receiving power of the terminal, and the measurement decision unit includes:

a first acquiring unit, configured to acquire, based on the first threshold value information and the supplementary information of the first threshold value information, a first value configured to be compared with the receiving power of the terminal;

a first determining unit, configured to determine whether to perform the intra-frequency measurement based on the first value and the receiving power of the terminal.

Optionally, the first determining unit includes:

a first output unit, configured to, in the case that the receiving power of the terminal is greater than the first value, determine that the intra-frequency measurement is not to be performed by the terminal;

a second output unit, configured to, in the case that the receiving power of the terminal is not greater than the first value, determining that the intra-frequency measurement is to be performed by the terminal.

Optionally, the parameter information includes the first threshold value information and the supplementary information of the first threshold value information which are configured to be compared with the receiving power of the terminal and the second threshold value information configured to be compared with the quality of the received signal of the terminal, and the measurement decision unit includes:

a second acquiring unit, configured to acquire, based on the first threshold value information and the supplementary information of the first threshold value information, a first value configured to be compared with the receiving power of the terminal, and obtain a second value based on the second threshold value information;

a second determining unit, configured to:

compare the receiving power of the terminal with the first value, and compare the quality of the received signal of the terminal with the second value;

in the case that the receiving power of the terminal is greater than the first value and the quality of the received signal of the terminal is greater than the second value, determine that the intra-frequency measurement is not to be performed by the terminal; and in the case that the receiving power of the terminal is not greater than the first value or the quality of the received signal of the terminal is not greater than the second value, determine that the intra-frequency measurement is to be performed by the terminal.

Optionally, the parameter information includes the first threshold value information and the supplementary information of the first threshold value information which are configured to be compared with the receiving power of the terminal and the third threshold value information configured to be compared with the received Signal to Interference plus Noise Ratio of the terminal, and the measurement decision unit includes:

a third acquiring unit, configured to acquire, based on the first threshold value information and the supplementary information of the first threshold value information, a first value configured to be compared with the receiving power of the terminal, obtain a second value based on the second threshold value information, and obtain a third value based on the third threshold value information;

a third determining unit, configured to:

compare the receiving power of the terminal with the first value, and compare the received Signal to Interference plus Noise Ratio of the terminal with the third value;

in the case that the receiving power of the terminal is greater than the first value and the received Signal to Interference plus Noise Ratio of the terminal is greater than the third value, determine that the intra-frequency measurement is not to be performed by the terminal; and in the case that the receiving power of the terminal is not greater than the first value or the received Signal to Interference plus Noise Ratio of the terminal is not greater than the third value, determine that the intra-frequency measurement is to be performed by the terminal.

Optionally, the parameter information includes the transmission power information of the base station and the first threshold value information and the supplementary information of the first threshold value information which are configured to be compared with the receiving power of the terminal, and the measurement decision unit includes:

a fourth acquiring unit, configured to acquire, based on the transmission power information of the base station and the first threshold value information and the supplementary information of the first threshold value information, a fourth value configured to be compared with the receiving power of the terminal;

a fourth determining unit, configured to:

compare the receiving power of the terminal with the fourth value;

in the case that the receiving power of the terminal is greater than the fourth value, determine that the intra-frequency measurement is not to be performed by the terminal; and in the case that the receiving power of the terminal is not greater than the fourth value, determine that the intra-frequency measurement is to be performed by the terminal.

Optionally, the parameter information includes the transmission power information of the base station, the first threshold value information and the supplementary information of the first threshold value information which are configured to be compared with the receiving power of the terminal and the second threshold value information configured to be compared with the quality of the received signal of the terminal, and the measurement decision unit includes:

a fifth acquiring unit, configured to acquire, based on the transmission power information of the base station and the first threshold value information and the supplementary information of the first threshold value information, a fourth value configured to be compared with the receiving power of the terminal, and obtain a second value based on the second threshold value information;

a fifth determining unit, configured to:

compare the receiving power of the terminal with the fourth value, and compare the quality of the received signal of the terminal with the second value;

in the case that the receiving power of the terminal is greater than the fourth value and the quality of the received signal of the terminal is greater than the second value, determine that the intra-frequency measurement is not to be performed by the terminal; and in the case that the receiving power of the terminal is not greater than the fourth value or the quality of the received signal of the terminal is not greater than the second value, determine that the intra-frequency measurement is to be performed by the terminal.

Optionally, the parameter information includes the transmission power information of the base station, the first threshold value information and the supplementary information of the first threshold value information which are configured to be compared with the receiving power of the terminal and the third threshold value information configured to be compared with the received Signal to Interference plus Noise Ratio of the terminal, and the measurement decision unit includes:

a sixth acquiring unit, configured to acquire, based on the transmission power information of the base station and the first threshold value information and the supplementary information of the first threshold value information, a fourth value configured to be compared with the receiving power of the terminal, and obtain a third value based on the third threshold value information;

a sixth determining unit, configured to:

compare the receiving power of the terminal with the fourth value, and compare the received Signal to Interference plus Noise Ratio of the terminal with the third value;

in the case that the receiving power of the terminal is greater than the fourth value and the received Signal to Interference plus Noise Ratio of the terminal is greater than the third value, determine that the intra-frequency measurement is not to be performed by the terminal; and in the case that the receiving power of the terminal is not greater than the first value or the received Signal to Interference plus Noise Ratio of the terminal is not greater than the third value, determine that the intra-frequency measurement is to be performed by the terminal.

Figure 10:
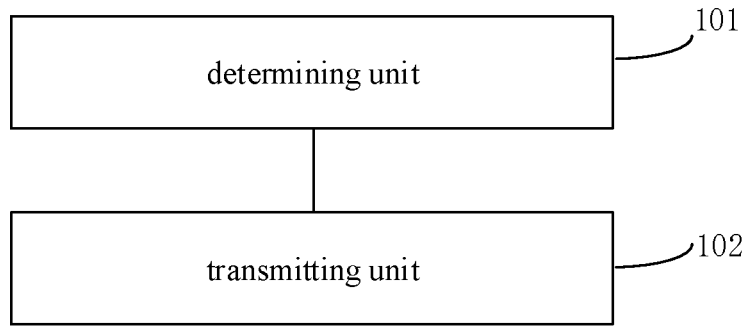
FIG. 10 is another schematic view of a device of triggering an intra-frequency measurement of a terminal in some embodiments of the present disclosure.

Based on the method in some embodiments of the present disclosure, a device of triggering an intra-frequency measurement of a terminal is further provided in some embodiments of the present disclosure, which may be arranged in a base station. Referring to FIG. 10, the device includes:

a determining unit 101, configured to determine parameter information configured to determine whether to trigger the intra-frequency measurement of the terminal; and a transmitting unit 102, configured to transmit the parameter information configured to determine whether to trigger the intra-frequency measurement of the terminal to the terminal.

Optionally, the parameter information includes one or more of:

transmission power information of the base station;

first threshold value information and supplementary information of the first threshold value information which are configured to be compared with a receiving power of the terminal, where the first threshold value information and the supplementary information of the first threshold value information together constitute a field corresponding to a new threshold value, or the first threshold value information represents a reference threshold configured to be compared with the receiving power of the terminal and the supplementary information of the first threshold value information represents a reference transmission power of the base station corresponding to the reference threshold;

second threshold value information configured to be compared with a quality of a received signal of the terminal; and third threshold value information configured to be compared with a received Signal to Interference plus Noise Ratio of the terminal.

Figure 11:
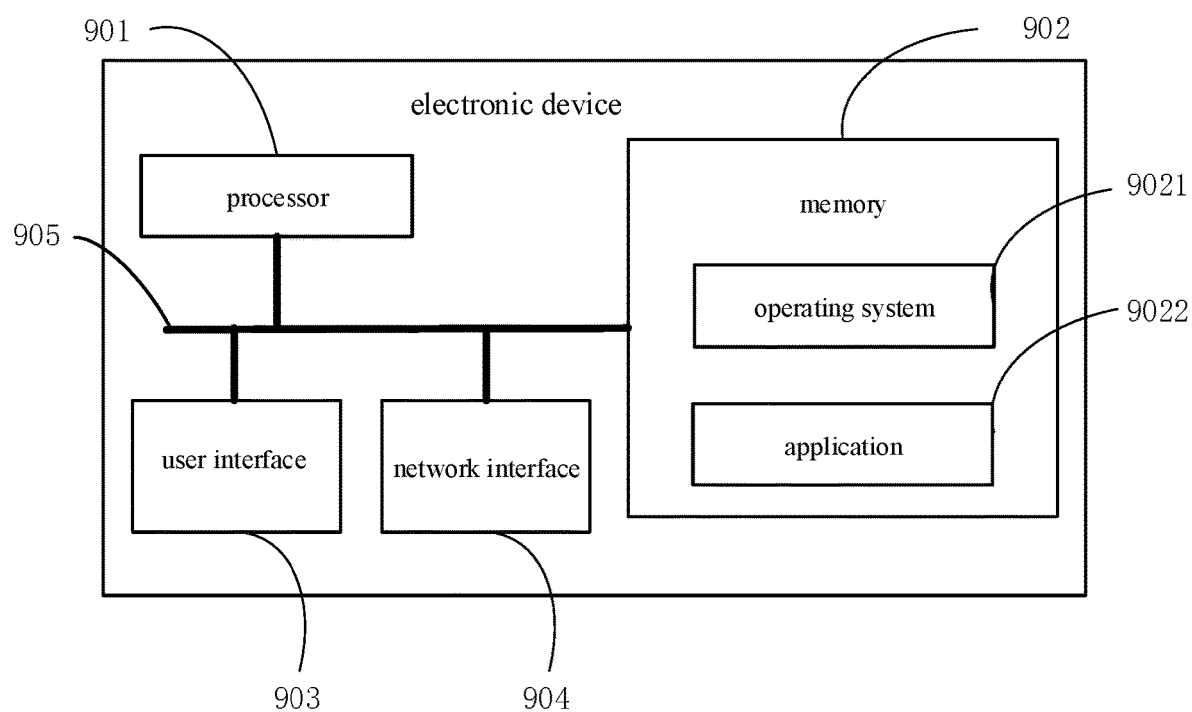
FIG. 11 is a schematic view of an electronic device in some embodiments of the present disclosure.

Please refer to FIG. 11 which is a view of an electronic device in some embodiments of the present disclosure. As shown in FIG. 11, the electronic device includes: at least one processor 1101, a memory 1102, at least one network interface 1104, and user interface 1103. The various components in the electronic device are coupled together by a bus system 1105. It will be appreciated that the bus system 1105 is configured to implement connection communication between these components. The bus system 1105 includes a power bus, a control bus, and a status signal bus in addition to the data bus. However, for clarity of description, various buses are labeled as the bus system 1105 in FIG.

The user interface 1103 may include a display, a keyboard, or a pointing device (e.g., a mouse, a track ball, a touch pad, or a touch screen, etc.).

It is to be understood that the memory 1102 in some embodiments of the present disclosure can be either volatile memory or non-volatile memory, or can include both volatile and nonvolatile memory. The non-volatile memory may be a read-only memory (ROM), a programmable read only memory (PROM), an erasable programmable read only memory (Erasable P ROM, EPROM), and a Erasable programmable read-only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory (Synchronous D RAM), SDRAM), double data rate synchronous dynamic random access memory (Double Data Rate SD RAM, DDRSDRAM), enhanced synchronous dynamic random access memory (ESDRAM), synchronously connected dynamic random access memory (Synch link) D RAM, SLDRAM) and Direct Memory Bus Random Access Memory (DRRAM). The memory 1102 of the systems and methods described herein is intended to comprise, without being limited to, these and any other suitable types of memory.

In some embodiments, memory 1102 stores elements, executable modules or data structures, or a subset thereof, or their extended set: operating system 11021 and application 11022.

The operating system 11021 includes various system programs, such as a framework layer, a core library layer, a driver layer, and the like, for implementing various basic services and processing hardware-based tasks. The application 11022 includes various applications, such as a media player (Media Player), a browser (Browser), etc., for implementing various application services. Programs that implement some of the embodiment methods of the present disclosure may be included in the application 11022.

In some embodiments of the present disclosure, by calling a program or an instruction stored in the memory 1102, specifically, the program or the instruction stored in the application 11022, the processor 1101 is configured to: acquire parameter information sent by a base station and configured to determine whether to trigger an intra-frequency measurement, and determine whether to perform the intra-frequency measurement based on the parameter information.

Optionally, the parameter information is the first threshold value information and the supplementary information of the first threshold value information which are configured to be compared with the receiving power of the terminal, where the processor 1101 is further configured to: acquire, based on the first threshold value information and the supplementary information of the first threshold value information, a first value configured to be compared with the receiving power of the terminal, and determine whether to perform the intra-frequency measurement based on the first value and the receiving power of the terminal.

Optionally, the processor 1101 is further configured to: in the case that the receiving power of the terminal is greater than the first value, determine that the terminal may not perform the intra-frequency measurement; in the case that the receiving power of the terminal is not greater than the first value, determine that the terminal may perform the intra-frequency measurement.

Optionally, the parameter information includes the first threshold value information and the supplementary information of the first threshold value information which are configured to be compared with the receiving power of the terminal and the second threshold value information configured to be compared with the quality of the received signal of the terminal, the processor 1101 is further configured to: acquire, based on the first threshold value information and the supplementary information of the first threshold value information, a first value configured to be compared with the receiving power of the terminal, and obtaining a second value based on the second threshold value information; compare the receiving power of the terminal with the first value, and compare the quality of the received signal of the terminal with the second value; in the case that the receiving power of the terminal is greater than the first value and the quality of the received signal of the terminal is greater than the second value, determine that the intra-frequency measurement is not to be performed by the terminal; in the case that the receiving power of the terminal is not greater than the first value or the quality of the received signal of the terminal is not greater than the second value, determine that the intra-frequency measurement is to be performed by the terminal.

Optionally, the parameter information includes the first threshold value information and the supplementary information of the first threshold value information which are configured to be compared with the receiving power of the terminal and the third threshold value information configured to be compared with the received Signal to Interference plus Noise Ratio of the terminal, the processor 1101 is further configured to: acquire, based on the first threshold value information and the supplementary information of the first threshold value information, a first value configured to be compared with the receiving power of the terminal, and obtain a second value based on the second threshold value information, and obtain a third value based on the third threshold value information; compare the receiving power of the terminal with the first value, and compare the received Signal to Interference plus Noise Ratio of the terminal with the third value; in the case that the receiving power of the terminal is greater than the first value and the received Signal to Interference plus Noise Ratio of the terminal is greater than the third value, determine that the intra-frequency measurement is not to be performed by the terminal; and in the case that the receiving power of the terminal is not greater than the first value or the received Signal to Interference plus Noise Ratio of the terminal is not greater than the third value, determine that the intra-frequency measurement is to be performed by the terminal.

Optionally, the parameter information includes the transmission power information of the base station and the first threshold value information and the supplementary information of the first threshold value information which are configured to be compared with the receiving power of the terminal, the processor 1101 is further configured to: acquire, based on the transmission power information of the base station and the first threshold value information and the supplementary information of the first threshold value information, a fourth value configured to be compared with the receiving power of the terminal; compare the receiving power of the terminal with the fourth value; in the case that the receiving power of the terminal is greater than the fourth value, determine that the intra-frequency measurement is not to be performed by the terminal; and in the case that the receiving power of the terminal is not greater than the fourth value, determine that the intra-frequency measurement is to be performed by the terminal.

Optionally, the parameter information includes the transmission power information of the base station, the first threshold value information and the supplementary information of the first threshold value information which are configured to be compared with the receiving power of the terminal and the second threshold value information configured to be compared with the quality of the received signal of the terminal.

The processor 1101 is further configured to acquire, based on the transmission power information of the base station and the first threshold value information and the supplementary information of the first threshold value information, a fourth value configured to be compared with the receiving power of the terminal, and obtain a second value based on the second threshold value information; compare the receiving power of the terminal with the fourth value, and compare the quality of the received signal of the terminal with the second value; in the case that the receiving power of the terminal is greater than the fourth value and the quality of the received signal of the terminal is greater than the second value, determine that the intra-frequency measurement is not to be performed by the terminal; and in the case that the receiving power of the terminal is not greater than the fourth value or the quality of the received signal of the terminal is not greater than the second value, determine that the intra-frequency measurement is to be performed by the terminal.

A computer-readable storage medium is further provided in some embodiments of the present disclosure, having stored thereon a computer program that, when executed by a processor, implements the steps of the method of any one of the above method embodiments.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual may achieve the objectives of the embodiments of the present disclosure.

In addition, each functional unit in various embodiments of the present disclosure may be integrated into one processing unit, or each unit may exist physically separately, or two or more units may be integrated into one unit.

The functions may be stored in a computer-readable storage medium in the case that implemented in the form of a software functional unit and sold or used as a standalone product. Based on such understanding, a portion of the technical solution of the present disclosure that contributes in essence or to the related art or a part of the technical solution may be embodied in the form of a software product stored in a storage medium, including several The instructions are for causing a computer device (which may be a personal computer, server, or network device, etc.) to perform all or part of the steps of the methods described in various embodiments of the present disclosure. The foregoing storage medium includes: a U disk, a mobile hard disk, a ROM, a RAM, a magnetic disk, or an optical disk, and the like, which can store program codes.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A method of triggering an intra-frequency measurement of a terminal, comprising:
   acquiring parameter information sent by a base station and configured to determine whether to trigger an intra-frequency measurement, wherein a value range of the parameter information is extended by information sent by the base station and configured to determine whether to trigger the intra-frequency measurement;
   determining whether to perform the intra-frequency measurement based on the extended parameter information;
   wherein the determining whether to perform the intra-frequency measurement based on the parameter information comprises:
   acquiring, from first threshold value information and extended information of the first threshold value information, a first value configured to be compared with a receiving power Srxlev of the terminal; and
   determining whether to perform the intra-frequency measurement based on the first value and the receiving power Srxlev of the terminal,
   wherein the determining whether to perform the intra-frequency measurement based on the first value and the receiving power Srxlev of the terminal comprises:
   in the case that the receiving power Srxlev of the terminal is greater than the first value, determining that the intra-frequency measurement is not to be performed by the terminal; and
   in the case that the receiving power Srxlev of the terminal is not greater than the first value, determining that the intra-frequency measurement is to be performed by the terminal.

2. The method according to claim 1, wherein the parameter information comprises one or more of:
   transmission power information of the base station;
   first information configured to be compared with a receiving power Srxlev of the terminal, wherein the first information is extended first threshold value information, the extended first threshold value information is obtained by extending a value range of first threshold value information;
   second threshold value information configured to be compared with a quality of a received signal of the terminal; and
   third threshold value information configured to be compared with a received Signal to Interference plus Noise Ratio of the terminal.

3. The method according to claim 2, wherein the parameter information comprises the first information configured to be compared with the receiving power Srxlev of the terminal and the second threshold value information configured to be compared with the quality of the received signal of the terminal, and the determining whether to perform the intra-frequency measurement based on the parameter information comprises:

acquiring, based on the first threshold value information and the extended information of the first threshold value information, a first value configured to be compared with the receiving power Srxlev of the terminal, and obtaining a second value based on the second threshold value information;

comparing the receiving power Srxlev of the terminal with the first value, and comparing the quality of the received signal of the terminal with the second value;

in the case that the receiving power Srxlev of the terminal is greater than the first value and the quality of the received signal of the terminal is greater than the second value, determining that the intra-frequency measurement is not to be performed by the terminal; and in the case that the receiving power Srxlev of the terminal is not greater than the first value or the quality of the received signal of the terminal is not greater than the second value, determining that the intra-frequency measurement is to be performed by the terminal.

4. The method according to claim 2, wherein the parameter information comprises the first information configured to be compared with the receiving power Srxlev of the terminal and the third threshold value information configured to be compared with the received Signal to Interference plus Noise Ratio of the terminal, and the determining whether to perform the intra-frequency measurement based on the parameter information comprises:

acquiring, based on the first threshold value information and the extended information of the first threshold value information, a first value configured to be compared with the receiving power Srxlev of the terminal, and obtaining a third value based on the third threshold value information;

comparing the receiving power Srxlev of the terminal with the first value, and comparing the received Signal to Interference plus Noise Ratio of the terminal with the third value;

in the case that the receiving power Srxlev of the terminal is greater than the first value and the received Signal to Interference plus Noise Ratio of the terminal is greater than the third value, determining that the intra-frequency measurement is not to be performed by the terminal; and in the case that the receiving power Srxlev of the terminal is not greater than the first value or the received Signal to Interference plus Noise Ratio of the terminal is not greater than the third value, determining that the intra-frequency measurement is to be performed by the terminal.

5. The method according to claim 2, wherein the parameter information comprises the transmission power information of the base station and the first threshold value information and the extended information of the first threshold value information which are configured to be compared with the receiving power Srxlev of the terminal, and the determining whether to perform the intra-frequency measurement based on the parameter information comprises:

acquiring, based on the transmission power information of the base station and the first threshold value information and the extended information of the first threshold value information, an extended fourth value configured to be compared with the receiving power Srxlev of the terminal;

comparing the receiving power Srxlev of the terminal with the fourth value;

in the case that the receiving power Srxlev of the terminal is greater than the fourth value, determining that the intra-frequency measurement is not to be performed by the terminal; and in the case that the receiving power Srxlev of the terminal is not greater than the fourth value, determining that the intra-frequency measurement is to be performed by the terminal.

6. The method according to claim 2, wherein the parameter information comprises the transmission power information of the base station, the first threshold value information and the extended information of the first threshold value information which are configured to be compared with the receiving power Srxlev of the terminal and the second threshold value information configured to be compared with the quality of the received signal of the terminal, and the determining whether to perform the intra-frequency measurement based on the parameter information comprises:

acquiring, based on the transmission power information of the base station and the first threshold value information and the extended information of the first threshold value information, an extended fourth value configured to be compared with the receiving power Srxlev of the terminal, and obtaining a second value based on the second threshold value information;

comparing the receiving power Srxlev of the terminal with the fourth value, and comparing the quality of the received signal of the terminal with the second value;

in the case that the receiving power Srxlev of the terminal is greater than the fourth value and the quality of the received signal of the terminal is greater than the second value, determining that the intra-frequency measurement is not to be performed by the terminal; and in the case that the receiving power Srxlev of the terminal is not greater than the fourth value or the quality of the received signal of the terminal is not greater than the second value, determining that the intra-frequency measurement is to be performed by the terminal.

7. The method according to claim 2, wherein the parameter information comprises the transmission power information of the base station, the first threshold value information and the extended information of the first threshold value information which are configured to be compared with the receiving power Srxlev of the terminal and the third threshold value information configured to be compared with the received Signal to Interference plus Noise Ratio of the terminal, and the determining whether to perform the intra-frequency measurement based on the parameter information comprises:

acquiring, based on the transmission power information of the base station and the first threshold value information and the extended information of the first threshold value information, an extended fourth value configured to be compared with the receiving power Srxlev of the terminal, and obtaining a third value based on the third threshold value information;

comparing the receiving power Srxlev of the terminal with the fourth value, and comparing the received Signal to Interference plus Noise Ratio of the terminal with the third value;

in the case that the receiving power Srxlev of the terminal is greater than the fourth value and the received Signal to Interference plus Noise Ratio of the terminal is greater than the third value, determining that the intra-frequency measurement is not to be performed by the terminal; and in the case that the receiving power Srxlev of the terminal is not greater than a first value or the received Signal to Interference plus Noise Ratio of the terminal is not greater than the third value, determining that the intra-frequency measurement is to be performed by the terminal.

8. A device of triggering an intra-frequency measurement of a terminal, comprising a processor and a memory, wherein the processor is configure configured to read programs stored in the memory to:

acquire parameter information sent by a base station and configured to determine whether to trigger an intra-frequency measurement, wherein a value range of the parameter information is extended by information sent by the base station and configured to determine whether to trigger the intra-frequency measurement; and determine whether to perform the intra-frequency measurement based on the extended parameter information, wherein the processor is configured to read the programs stored in the memory to:

acquire, from the first threshold value information and the extended information of the first threshold value information, a first value configured to be compared with the receiving power Srxlev of the terminal;

determine whether to perform the intra-frequency measurement based on the first value and the receiving power Srxlev of the terminal, wherein the processor is configured to read the programs stored in the memory to:

in the case that the receiving power Srxlev of the terminal is greater than the first value, determine that the intra-frequency measurement is not to be performed by the terminal;

in the case that the receiving power Srxlev of the terminal is not greater than the first value, determining that the intra-frequency measurement is to be performed by the terminal.

9. The device according to claim 8, wherein the parameter information comprises one or more of:

transmission power information of the base station;

first information configured to be compared with a receiving power Srxlev of the terminal, wherein the first information is extended first threshold value information, the extended first threshold value information is obtained by extending a value range of first threshold value information;

second threshold value information configured to be compared with a quality of a received signal of the terminal; and third threshold value information configured to be compared with a received Signal to Interference plus Noise Ratio of the terminal.

10. The device according to claim 9, wherein the parameter information comprises the first information configured to be compared with the receiving power Srxlev of the terminal and the second threshold value information configured to be compared with the quality of the received signal of the terminal, and the processor is configured to read the programs stored in the memory to:

acquire, based on the first threshold value information and the extended information of the first threshold value information, a first value configured to be compared with the receiving power Srxlev of the terminal, and obtain a second value based on the second threshold value information;

compare the receiving power Srxlev of the terminal with the first value, and compare the quality of the received signal of the terminal with the second value;

in the case that the receiving power Srxlev of the terminal is greater than the first value and the quality of the received signal of the terminal is greater than the second value, determine that the intra-frequency measurement is not to be performed by the terminal; and in the case that the receiving power Srxlev of the terminal is not greater than the first value or the quality of the received signal of the terminal is not greater than the second value, determine that the intra-frequency measurement is to be performed by the terminal.

11. The device according to claim 9, wherein the parameter information comprises the transmission power information of the base station and the first threshold value information and the extended information of the first threshold value information which are configured to be compared with the receiving power Srxlev of the terminal, and the processor is configured to read the programs stored in the memory to:

acquire, based on the transmission power information of the base station and the first threshold value information and the extended information of the first threshold value information, an extended fourth value configured to be compared with the receiving power Srxlev of the terminal;

compare the receiving power Srxlev of the terminal with the fourth value;

in the case that the receiving power Srxlev of the terminal is greater than the fourth value, determine that the intra-frequency measurement is not to be performed by the terminal; and in the case that the receiving power Srxlev of the terminal is not greater than the fourth value, determine that the intra-frequency measurement is to be performed by the terminal.

12. The device according to claim 9, wherein the parameter information comprises the transmission power information of the base station, the first information configured to be compared with the receiving power Srxlev of the terminal and the second threshold value information configured to be compared with the quality of the received signal of the terminal, and the processor is configured to read the programs stored in the memory to:

acquire, based on the transmission power information of the base station and the first threshold value information and the extended information of the first threshold value information, an extended fourth value configured to be compared with the receiving power Srxlev of the terminal, and obtain a second value based on the second threshold value information;

compare the receiving power Srxlev of the terminal with the fourth value, and compare the quality of the received signal of the terminal with the second value;

in the case that the receiving power Srxlev of the terminal is greater than the fourth value and the quality of the received signal of the terminal is greater than the second value, determine that the intra-frequency measurement is not to be performed by the terminal; and in the case that the receiving power Srxlev of the terminal is not greater than the fourth value or the quality of the received signal of the terminal is not greater than the second value, determine that the intra-frequency measurement is to be performed by the terminal.

13. The device according to claim 9, wherein the parameter information comprises the transmission power information of the base station, the first threshold value information and the extended information of the first threshold value information which are configured to be compared with the receiving power Srxlev of the terminal and the third threshold value information configured to be compared with the received Signal to Interference plus Noise Ratio of the terminal, and the processor is configured to read the programs stored in the memory to:
   acquire, based on the transmission power information of the base station and the first threshold value information and the extended information of the first threshold value information, an extended fourth value configured to be compared with the receiving power Srxlev of the terminal, and obtain a third value based on the third threshold value information;
   compare the receiving power Srxlev of the terminal with the fourth value, and compare the received Signal to Interference plus Noise Ratio of the terminal with the third value;
   in the case that the power receiving power Srxlev of the terminal is greater than the fourth value and the received Signal to Interference plus Noise Ratio of the terminal is greater than the third value, determine that the intra-frequency measurement is not to be performed by the terminal; and
   in the case that the power receiving power Srxlev of the terminal is not greater than the first value or the received Signal to Interference plus Noise Ratio of the terminal is not greater than the third value, determine that the intra-frequency measurement is to be performed by the terminal.

14. The device according to claim 8, wherein the parameter information comprises the first information configured to be compared with the receiving power Srxlev of the terminal and the third threshold value information configured to be compared with the received Signal to Interference plus Noise Ratio of the terminal, and the processor is configured to read the programs stored in the memory to:
   acquire, based on the first threshold value information and the extended information of the first threshold value information, a first value configured to be compared with the receiving power Srxlev of the terminal, obtain a second value based on the second threshold value information, and obtain a third value based on the third threshold value information;
   compare the receiving power Srxlev of the terminal with the first value, and compare the received Signal to Interference plus Noise Ratio of the terminal with the third value;
   in the case that the receiving power Srxlev of the terminal is greater than the first value and the received Signal to Interference plus Noise Ratio of the terminal is greater than the third value, determine that the intra-frequency measurement is not to be performed by the terminal; and
   in the case that the receiving power Srxlev of the terminal is not greater than the first value or the received Signal to Interference plus Noise Ratio of the terminal is not greater than the third value, determine that the intra-frequency measurement is to be performed by the terminal.

15. A method of triggering an intra-frequency measurement of a terminal, comprising:
   determining, by a base station, parameter information configured to determine whether to trigger the intra-frequency measurement of the terminal, wherein a value range of the parameter information is extended by information sent by the base station and configured to determine whether to trigger the intra-frequency measurement; and
   transmitting, by the base station, the extended parameter information configured to determine whether to trigger the intra-frequency measurement of the terminal to the terminal,
   wherein the determining whether to perform the intra-frequency measurement based on the parameter information comprises:
   acquiring, from first threshold value information and extended information of the first threshold value information, a first value configured to be compared with a receiving power Srxlev of the terminal; and
   determining whether to perform the intra-frequency measurement based on the first value and the receiving power Srxlev of the terminal,
   wherein the determining whether to perform the intra-frequency measurement based on the first value and the receiving power Srxlev of the terminal comprises:
   in the case that the receiving power Srxlev of the terminal is greater than the first value, determining that the intra-frequency measurement is not to be performed by the terminal; and
   in the case that the receiving power Srxlev of the terminal is not greater than the first value, determining that the intra-frequency measurement is to be performed by the terminal.

16. A device of triggering an intra-frequency measurement of a terminal, comprising a processor and a memory, wherein the processor is configured to read programs stored in the memory to perform the method of triggering an intra-frequency measurement of a terminal according to claim 15.

* * * * *